United States Patent [19]

Rumyantsev et al.

[11] 4,183,424

[45] Jan. 15, 1980

[54] VEHICLE GEARCHANGE LEVER WITH CLUTCHSWITCH

[76] Inventors: Leonid A. Rumyantsev, Bolshaya Akademicheskaya ulitsa, 77, korpus 3, kv. 79; Jury K. Esenovsky-Lashkov, ulitsa Festivalnaya, 31, kvartal 125; Anatoly A. Lisevich, Koptevsky bulvar, 6, kv. 64; Jury L. Kanevsky, ulitsa Zatsepa, 13/6, kv. 25, all of Moscow; Vladimir P. Steshenko, ulitsa Shkolnaya, 31, kv. 97; Vladimir I. Guba, ulitsa Shkolnaya, 31, kv. 24, both of Zaporozhie; Vladimir A. Abramian, ulitsa Nogovitsina, 4, kv. 60, Izhevsk; Jury A. Tronin, ulitsa Avtozavodskaya, 4, kv. 52, Izhevsk; Petr V. Fedorov, ulitsa Voroshilova, 40, kv. 17, Izhevsk; Boris B. Nazarov, ploschad Pobedy, 2, kv. 22; Mikhail A. Mironenko, ulitsa Grizodubovoi, 58, kv. 53, both of Melitopol, all of U.S.S.R.

[21] Appl. No.: 789,651

[22] Filed: Apr. 21, 1977

[51] Int. Cl.² .............. B60K 29/02; H01H 27/06
[52] U.S. Cl. .................. 192/3.58; 200/61.88; 403/316; 403/317
[58] Field of Search .............. 192/3.56, 3.58, 3.59; 200/61.85, 61.86, 61.88, 61.91

[56] References Cited

U.S. PATENT DOCUMENTS

| | | | |
|---|---|---|---|
| 2,263,047 | 11/1941 | Newton | 192/3.58 |
| 2,732,447 | 1/1956 | Findley | 192/3.56 |
| 2,813,942 | 11/1957 | Binder | 192/3.56 |

FOREIGN PATENT DOCUMENTS 865539  4/1961  United Kingdom ............... 200/61.88

*Primary Examiner*—Benjamin W. Wyche
*Attorney, Agent, or Firm*—Fleit & Jacobson

[57] ABSTRACT

A vehicle gearchange lever comprising a rod with a longitudinal hollow accommodating a current conduction element electrically connected with a clutch and with a contact mounted on said rod. The gearchange lever also comprises a knob with a contact mounted therein, which knob is elastically mounted on the rod and is adapted to be moved relative to the rod for the purpose of closing the contacts in the process of gearchange. The contact mounted on the rod is constructed in the form of a cup installed on a sleeve made of an insulating material and removably mounted on the rod. The knob is hollow, has a hole for the rod to fit therethrough with a clearance, and bears on a shoulder provided on the rod. Said clearance is dimensioned so as to enable the contacts to be closed by moving the knob in the process of gearchange.

2 Claims, 8 Drawing Figures

VEHICLE GEARCHANGE LEVER WITH CLUTCHSWITCH

The present invention relates to transport engineering, more particularly, to gearchange levers employed for vehicle gearbox control.

The gearchange lever constituting the present invention can be used with particular advantage in motor vehicles wherein automated clutches and semiautomatic transmissions are employed.

Known in the art are gearchange levers having a longitudinal hollow which accommodates a current conducting element electrically connected with a clutch control contact mounted on the lever, another clutch to control contact being provided in the lever knob. The lever has a spherical surface adapted to mate with a corresponding surface inside the lever knob, this constructional arrangement providing for said contacts to become closed when the driver shifts the gearchange lever for the purpose of effecting a gearchange. When the shifting force has been removed, the knob is returned into the initial position by the action of a spring fitted between the lever and the knob.

The gearchange levers described above suffer from the disadvantage that their manufacture is complicated by the necessity of producing two spherical surfaces one of which is convex and the other is concave. Furthermore, such gearchange levers need a complicated procedure for assembling and disassembling them in service.

It is an object of the present invention to provide a vehicle gearchange lever of a comparatively simple construction, said gearchange lever being adapted for comparatively quick assembly and disassembly of its components in service.

It is another object of the present invention to provide a vehicle gearchange lever featuring increased operating reliability.

It is still another object of the present invention to prevent the possibility of accidental closing of the contacts due to vibration of the motor vehicle or components thereof.

These and other objects are achieved by providing a vehicle gearchange lever comprising a rod with a longitudinal hollow accommodating a current conducting element one end of which is electrically connected with a clutch control device and the other end is electrically connected with a clutch control contact mounted on said rod. Said gearchange lever also comprises a knob which accommodates another clutch control contact and is elastically mounted on the rod, there being provision for the knob to be moved relative to the rod for the purpose of closing said contacts in the process of gearchange. According to the invention, the contact mounted on the gearchange lever rod is constructed in the form of a cup fitted on a sleeve made of insulating material and removably mounted on said rod. The knob is hollow and rests on a shoulder provided on the rod. The bottom end of the knob has a hole into which the rod fits with a clearance dimensioned so as to enable the contacts to be closed by moving the knob in the process of gearchange.

It is desirable that the sleeve be attached to the rod by means of fastening disposed around the sleeve periphery slightly below the edge of the cup and prevented from moving outward by a spring-loaded flanged washer.

This method of attaching the sleeve is simplest and most secure as regards the conditions of motor vehicle service.

The vehicle gearchange lever constituting the present invention is simple in construction, has a comparatively low manufacturing cost, can be easily assembled and disassembled in service, and is reliable in operation.

Now the invention will be described in detail with reference to the accompanying drawings in which.

Figure 1:
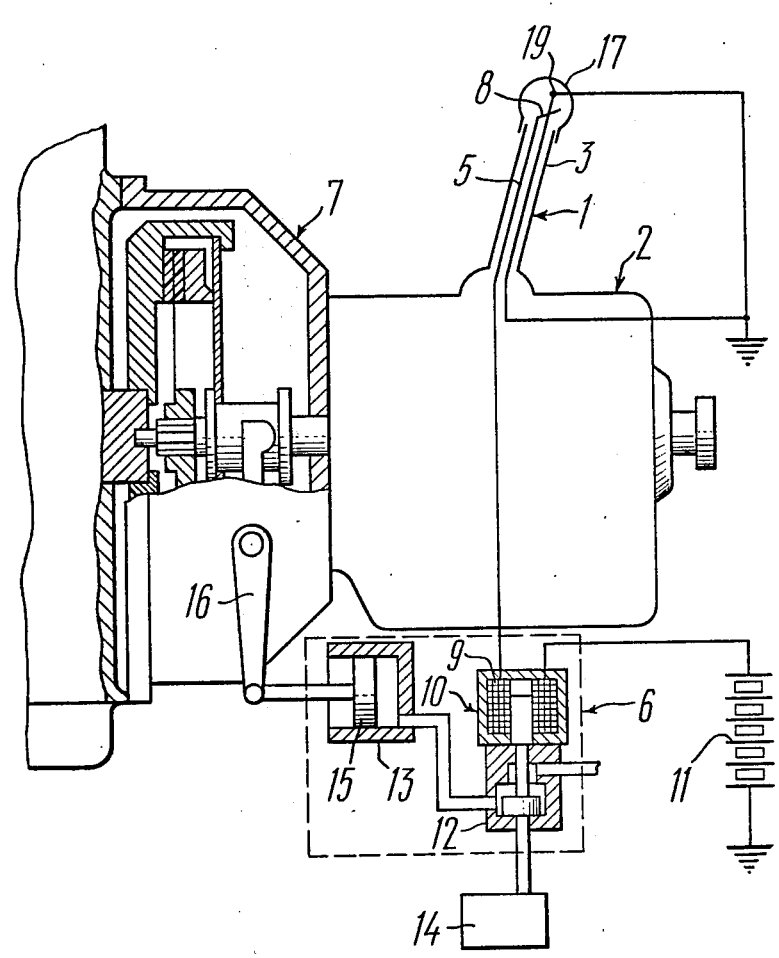
FIG. 1 shows a clutch and a gearbox, the latter being equipped with the gearchange lever constituting the present invention.
Figure 2:
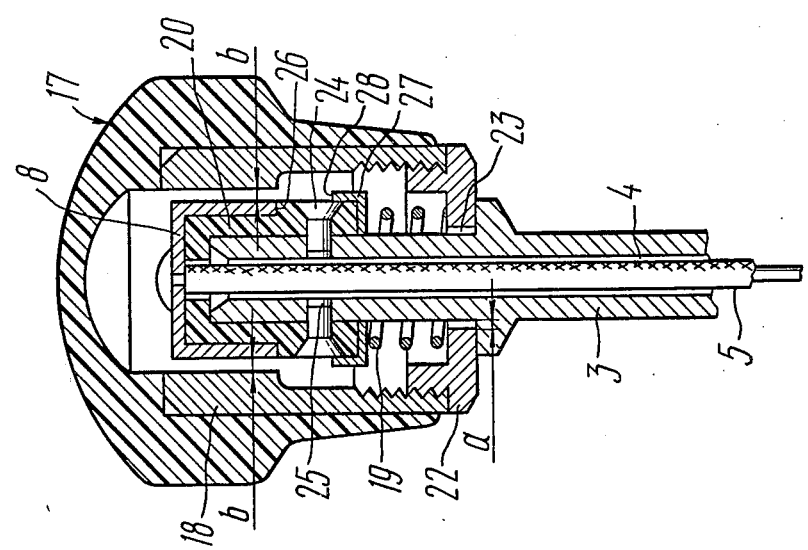
FIG. 2 is a longitudinal sectional view of the gearchange lever.
Figure 7:
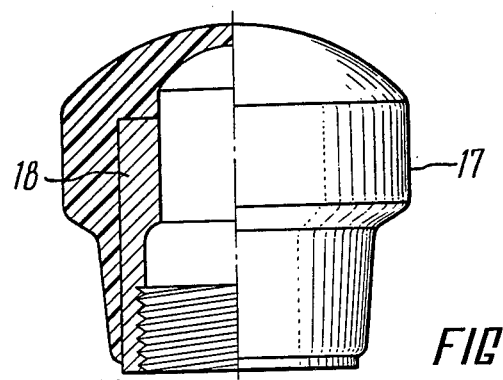
FIGS. 3, 4, 5, 6 and 7 show the gearchange lever parts in their order of assembly.
Figure 3:
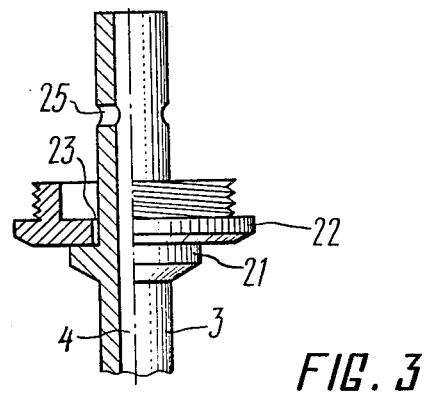

The gearchange lever 1 (FIG. 1) is mounted on a vehicle gearbox 2. The gearchange lever 1 comprises a rod 3 which has a longitudinal hollow 4 (FIGS. 2, 3) accommodating a current conducting element 5 electrically connected at one end with a device 6 (FIG. 1) designed to control a clutch 7 and at the other end with a contact 8.

The current conducting element 5 is electrically connected with the winding 9 of an electromagnet 10, said winding being connected to a storage battery 11. When making a gearchange in the gearbox 2, the electromagnet 10 actuates a valve 12 incorporated in the clutch control device 6 for said valve to connect a power cylinder 13 alternately to a compressed air source 14 and to the atmosphere. The piston 15 of the power cylinder 13 is mechanically connected to a clutch operating lever 16.

The gearchange lever 1 has a hollow knob 17 on the inner surface of which is mounted another contact 18 (FIG. 2), said contact being constructed in the form of a sleeve.

The knob 17 is elastically mounted on the rod 3 by means of a spring 19.

The knob 17 is adpated for moving relative to the rod 3 for the purpose of closing the contacts 8 and 18 in the process of gearchange.

The contact 8 is mounted on the rod 3 and is constructed in the form of a cup, said cup being designated hereinafter also by the numeral 8.

The cup 8 is installed on a sleeve 20 which is made of an insulating material and is removably mounted on the rod 3.

The rod 3 is provided with a shoulder 21 having a flat surface on which the knob 17 bears through a ring 22. The ring 22 is a part of the knob 17 and is united therewith by means of the contact 18. The ring 22 has a hole 23 for the rod 3 to pass therethrough.

A clearance "a" is provided between the rod 3 and the hole 23. This clearance is dimensioned so as to enable the contacts 8 and 18 to be closed by moving the knob 17 in the process of gearchange.

Figure 6:
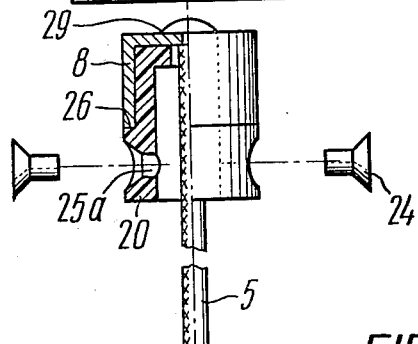
Figure 5:
Figure 4:
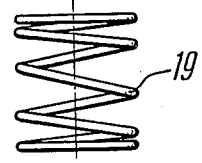

The sleeve 20 is attached to the rod 3 by means of fastenings 24 which are essentially retaining pins and are called so hereinafter, being also designated by the numeral 24. The retaining pins 24 are located slightly below the edge 26 of the cup 8 and fit into holes 25 provided in the rod 3 and into holes 25a (FIG. 6) provided in the sleeve 20. The retaining pins 24 are prevented from outward movement by means of a washer 27 (FIGS. 2 and 5) having a flange 28 (FIG. 5). The washer 27 is loaded by the spring 19 fitted between the ring 22 and the washer 27.

This constructional arrangement of the gearchange lever is relatively simple and provides for simple and easy assembly and disassembly.

The procedure for assembling the gearchange lever 1 is as follows:

Referring to FIGS. 3, 4, 5, 6 and 7, the following parts are installed on the rod 3 in succession: the ring 22, the spring 19, the washer 27, and the sleeve 20 complete with the cup 8 attached thereto and the current conducting element 5 passed through a hole 29 (FIG. 6) in the sleeve 20. The current conducting element 5 is attached to the cup 8 by any suitable method known in the art. The sleeve 20, complete with the cup 8 and current conducting element 5, is mounted on the end of the rod 3.

The washer 27 is pressed against the action of the spring 19 so as to expose the radial holes 25a in the sleeve 20. The retaining pins 24 are fitted into the holes 25a and the latter are aligned with the holes 25 in the rod 3. After the retaining pins 24 are fitted into the holes 25, the washer 27 is released and moved upward (as shown) by the spring 19 so that the washer flange 28 prevents the retaining pins 24 from moving outward from the holes 25 in the rod 3.

The contact 18 together with the knob 17 attached thereto is screwed onto the ring 22.

Figure 8:
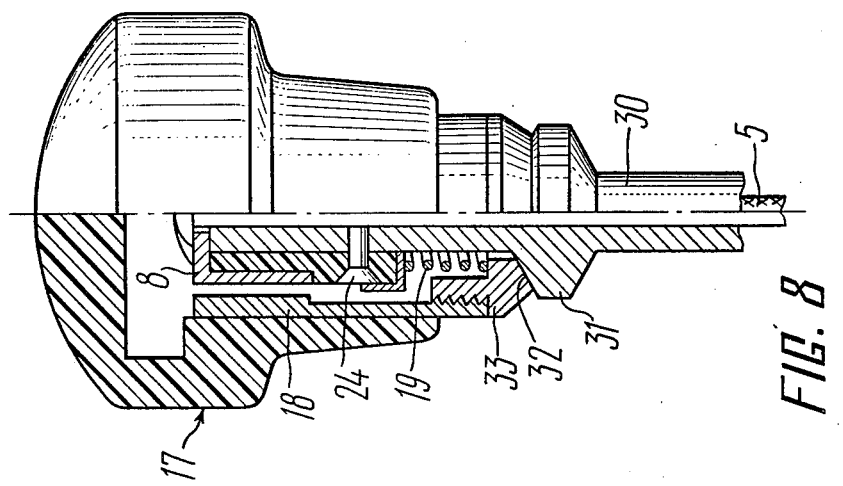
FIG. 8 shows another embodiment of the gearchange lever wherein the rod has a taper shoulder.

In another embodiment of the invention, a rod 30 (FIG. 8) has a shoulder 31 with a taper surface 32 which gives support to a ring 33 attached to the knob 17 by means of the contact 18. The surface of the ring 33 which bears on the shoulder 31 is tapered whereby provision is made for maintaining a uniform circular clearance "a" between the shoulder 31 and the ring 33 when the shifting force is removed from the gearchange lever 1.

The gearchange lever operates as follows:

When a shifting force is applied to the gearchange lever 1 for the purpose of effecting a gearchange in the gearbox 2, the knob 17 is moved whereby the gap "b" (FIG. 2) between the contact 18 and the cup 8 is taken up on one side. The gap "b" is dimensioned slightly larger than the clearance "a". Due to the movement of the knob 17 the ring 22 leaves the shoulder 21 on one side, the spring 19 becomes compressed, and the contacts 8 and 18 close, taking up the gap "b" on the side where the shifting force is applied. The electric current from the storage battery 11 flows through the grounded rod 3, ring 22, contacts 18 and 8, the current conducting element 5, and the winding 9 of the electromagnet 10. Consequently, the valve 12 puts the power cylinder 13 in communication with the compressed air source 14. The piston 15 of the power cylinder 13 actuates the clutch operating lever 16 and thereby the clutch 7 is disengaged.

Upon removal of the shifting force from the gearchange lever 1, the spring 19 expands, the ring 22 becomes seated on the shoulder 21, and the contact 18 leaves the contact 8, breaking the circuit. The winding 9 of the electromagnet 10 becomes de-energized, the valve 12 puts the power cylinder 13 in communication with the atmosphere, and the clutch 7 is thereby engaged.

The gearchange lever constituting the present invention has been successfully tested in automatic electrohydraulic and electrovacuum clutch operating mechanisms in passenger cars as well as in a truck hydromechanical transmission. The tests have shown perfect gearchange performanace, reliability, freedom from accidental operation on rough roads, simplicity of assembly and disassembly work in the motor vehicle, and compactness of the gearchange lever.

What is claimed is:

1. A gearchange lever for effecting control of a vehicle gearbox and a clutch, comprising: a rod with a longitudinal hollow provided therein; a current conducting element accommodated in said longitudinal hollow, one end of said current conducting element being connected to said clutch for the purpose of effecting control of its engagement and disengagement; a sleeve made of an insulating material and removably mounted on the end of said rod; a contact constructed in the form of a cup and mounted on said sleeve, said contact being electrically connected with the other end of said current conducting element; a hollow knob elastically mounted on said rod; a contact mounted in said knob; a shoulder provided on said rod for the bottom end of said knob to rest thereupon, the end of said rod being located together with the contact mounted thereon, inside said knob, there being a hole provided in said knob for said rod to fit therethrough with a clearance, said knob being adapted to move relative to the rod for the purpose of closing said contacts in the process of gearchange, and the clearance of the rod in the hole being dimensioned so as to enable the contacts to be closed by moving said knob in the process of gearchange, said sleeve being attached to the rod by means of fastening disposed round the sleeve periphery slightly below the edge of the cup and being prevented from outward movement by provision of a spring-loaded flanged washer.

2. A gear change lever for effecting control of a vehicle gearbox and a clutch, comprising: a conducting rod with a longitudinal hollow provided therein; a current conducting element accommodated in said longitudinal hollow, said current conducting element being insulated to prevent electrical contact between said element and said conducting rod, one end of said current conducting element being connected to said clutch for the purpose of effecting control of its engagement and disengagement; a sleeve made of an insulating material and removably mounted on the end of said conducting rod; a contact constructed in the form of a cup and mounted on said sleeve, said contact being electrically connected with the other end of said current conducting element; a hollow knob elastically mounted on said conducting rod, said hollow knob having an insulated upper portion, a conducting lower portion, and a contact portion partially positioned inside said upper portion and interconnected between said upper and said lower portions; a shoulder provided on said rod for the lower portion of said knob to rest thereupon, the end of said conducting rod being located together with the contact mounted thereon, inside said knob; a portion of said lower portion of said knob defining a passageway for said conducting rod to fit therethrough with a clearance, said portion being directly connected with said contact mounted in said knob, said passageway in the process of a gear change allowing movement of said knob relative to said conducting rod for closing said contacts thereby forming an electric circuit between said current conducting element and said conducting rod.

* * * * *